US012617199B2

(12) United States Patent
Katsuda et al.

(10) Patent No.: US 12,617,199 B2

(45) Date of Patent: May 5, 2026

(54) LIQUID EJECTING APPARATUS AND LIQUID EJECTING METHOD

(71) Applicant: SEIKO EPSON CORPORATION, Tokyo (JP)

(72) Inventors: Osamu Katsuda, Matsumoto (JP); Hirokazu Sekino, Chino (JP)

(73) Assignee: SEIKO EPSON CORPORATION (JP)

( * ) Notice: Subject to any disclaimer, the term of this patent is extended or adjusted under 35 U.S.C. 154(b) by 223 days.

(21) Appl. No.: 18/520,623

(22) Filed: Nov. 28, 2023

(65) Prior Publication Data

US 2024/0173960 A1 May 30, 2024

(30) Foreign Application Priority Data

Nov. 29, 2022 (JP) ................................ 2022-190448

(51) Int. Cl.

*B41J 2/175* (2006.01)
*B41J 2/03* (2006.01)
*B41J 2/145* (2006.01)
*B41J 11/00* (2006.01)

(52) U.S. Cl.

CPC ................ *B41J 2/03* (2013.01); *B41J 2/145* (2013.01); *B41J 2/175* (2013.01); *B41J 11/007* (2013.01)

(58) Field of Classification Search

CPC ..... B41J 2/03; B41J 2/145; B41J 2/175; B41J 11/007

See application file for complete search history.

(56) References Cited

U.S. PATENT DOCUMENTS

| | | | | |
|---|---|---|---|---|
| 7,553,375 B2 * | 6/2009 | Sekiya | ................ | B41J 2/14016 118/62 |
| 2007/0200898 A1 * | 8/2007 | Ueno | .................. | B41J 2/04581 347/55 |
| 2018/0257384 A1 * | 9/2018 | Hara | .......................... | B41J 2/18 |
| 2021/0060988 A1 * | 3/2021 | Komada | ................... | B41J 2/21 |

FOREIGN PATENT DOCUMENTS

| | | |
|---|---|---|
| JP | 2022-109418 A | 7/2022 |

* cited by examiner

*Primary Examiner* — Jason S Uhlenhake

(74) *Attorney, Agent, or Firm* — Harness, Dickey & Pierce, P.L.C.

(57) ABSTRACT

A liquid ejecting apparatus includes: a conveyor for a medium; a carriage configured to move in a carriage movement direction at a position facing the conveyed medium; a head provided on the carriage and including at least one nozzle configured to eject a liquid to the medium in a continuous flow, make the continuous flow into droplets, and cause the droplets to collide with the medium; a liquid storage configured to store the liquid to be sent to the nozzle; and a liquid sending unit configured to send the liquid in the liquid storage to the nozzle continuously while restricting a pressure fluctuation during one time of movement of the carriage in the carriage movement direction. A volume of the liquid storage is larger than a volume of the liquid ejected from the nozzle during one time of movement of the carriage in the carriage movement direction.

10 Claims, 15 Drawing Sheets

LIQUID EJECTING APPARATUS AND LIQUID EJECTING METHOD

The present application is based on, and claims priority from JP Application Serial Number 2022-190448, filed Nov. 29, 2022, the disclosure of which is hereby incorporated by reference herein in its entirety.

BACKGROUND

1. Technical Field

The present disclosure relates to a liquid ejecting apparatus and a liquid ejecting method.

2. Related Art

In related art, various types of liquid ejecting apparatuses for ejecting a liquid to an object are used. Among such liquid ejecting apparatuses, there is a liquid ejecting apparatus capable of ejecting a liquid in a continuous flow, making the continuous flow into droplets, and causing the continuous flow to collide with an object in a form of droplets. For example, JP-A-2022-109418 discloses a liquid ejecting apparatus capable of cleaning or crushing an object with a liquid in a form of droplets having a high cleaning effect or crushing effect in consideration of a liquid droplet formation distance at which a continuous flow of the liquid is converted into droplets.

However, in a liquid ejecting apparatus in the related art that is capable of ejecting a liquid in a continuous flow, making the continuous flow into droplets, and causing the continuous flow to collide with an object in the form of droplets as described in JP-A-2022-109418, depending on a configuration of a liquid sending unit such as a pump used for ejecting the liquid, pulsation may occur in the liquid being sent and unevenness may occur in a liquid sending pressure. When the unevenness occurs in the liquid sending pressure, unevenness also occurs in the ejection of the liquid, and unevenness may occur in the cleaning or crushing of the object.

SUMMARY

A liquid ejecting apparatus according to an aspect of the present disclosure for solving the above problem includes: a conveyor configured to convey a medium in a conveyance direction; a carriage configured to move in a carriage movement direction intersecting the conveyance direction at a position facing the medium conveyed in the conveyance direction; a head provided on the carriage and including at least one nozzle configured to eject a liquid to the medium in a continuous flow, make the continuous flow into droplets, and cause the continuous flow to collide with the medium in a form of droplets; a liquid storage configured to store the liquid to be sent to the nozzle; and a liquid sending unit configured to send the liquid in the liquid storage to the nozzle continuously while restricting a pressure fluctuation within a predetermined pressure range during one time of movement of the carriage in the carriage movement direction. A volume of the liquid storage is larger than a volume of the liquid ejected from the nozzle during one time of movement of the carriage in the carriage movement direction.

A liquid ejecting method according to an aspect of the present disclosure for solving the above problem is a liquid ejecting method for a liquid ejecting apparatus. The liquid ejecting apparatus includes: a conveyor configured to convey a medium in a conveyance direction; a carriage configured to move in a carriage movement direction intersecting the conveyance direction at a position facing the medium conveyed in the conveyance direction; a head provided on the carriage and including at least one nozzle configured to eject a liquid to the medium in a continuous flow, make the continuous flow into droplets, and cause the continuous flow to collide with the medium in a form of droplets; a liquid storage configured to store the liquid to be sent to the nozzle; and a liquid sending unit configured to send the liquid in the liquid storage to the nozzle continuously. The liquid ejecting method includes: using the liquid storage whose volume is larger than a volume of the liquid ejected from the nozzle during one time of movement of the carriage in the carriage movement direction; and when the liquid is ejected from the nozzle, continuously sending the liquid in the liquid storage to the nozzle by the liquid sending unit while restricting a pressure fluctuation within a predetermined pressure range during one time of movement of the carriage in the carriage movement direction.

DESCRIPTION OF EMBODIMENTS

Figure 1:
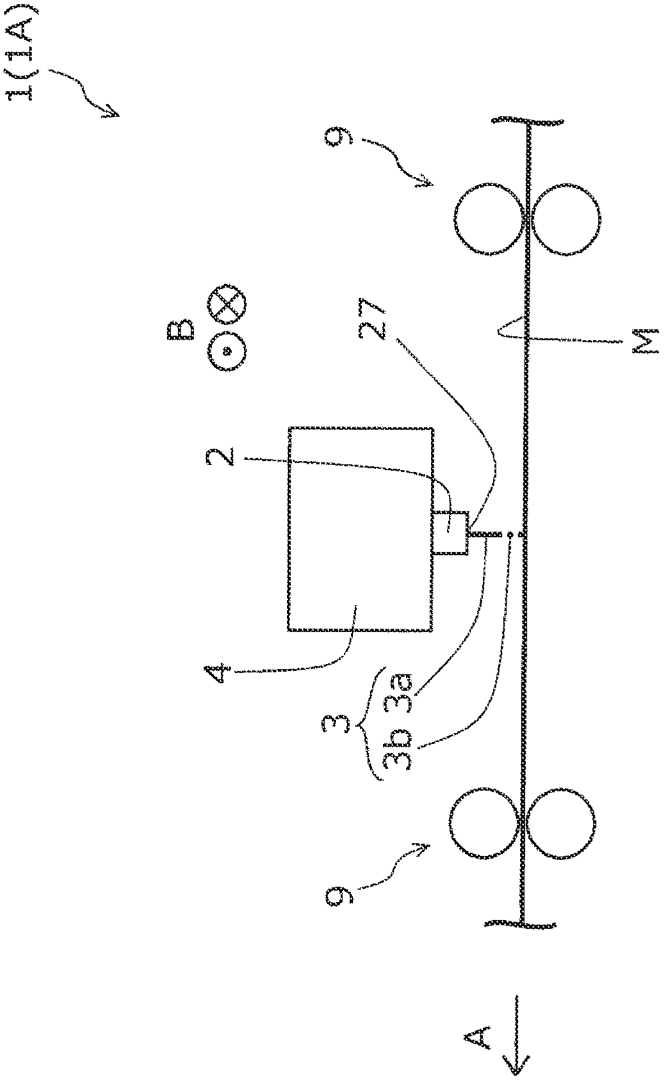
FIG. 1 is a schematic side view showing a liquid ejecting apparatus according to a first embodiment.

First, the present disclosure will be schematically described.

A liquid ejecting apparatus according to a first aspect of the present disclosure for solving the above problem includes: a conveyor configured to convey a medium in a conveyance direction; a carriage configured to move in a carriage movement direction intersecting the conveyance direction at a position facing the medium conveyed in the conveyance direction; a head provided on the carriage and including at least one nozzle configured to eject a liquid to the medium in a continuous flow, make the continuous flow into droplets, and cause the continuous flow to collide with the medium in a form of droplets; a liquid storage configured to store the liquid to be sent to the nozzle; and a liquid sending unit configured to send the liquid in the liquid storage to the nozzle continuously while restricting a pressure fluctuation within a predetermined pressure range during one time of movement of the carriage in the carriage movement direction. A volume of the liquid storage is larger than a volume of the liquid ejected from the nozzle during one time of movement of the carriage in the carriage movement direction.

According to the aspect, by using the liquid storage whose volume is larger than a volume of the liquid ejected from the nozzle during the one time of movement of the carriage in the carriage movement direction, when the liquid is ejected from the nozzle, it is possible to send the liquid in the liquid storage to the nozzle by the liquid sending unit continuously while restricting a pressure fluctuation within a predetermined pressure range during one time of movement of the carriage in the carriage movement direction. Therefore, an occurrence of pulsation in the liquid being sent can be prevented, and an occurrence of unevenness in a liquid sending pressure can be prevented. Accordingly, it is possible to prevent ejecting unevenness when the liquid ejected in the continuous flow collides with the medium in the form of the droplets.

The liquid ejecting apparatus according to a second aspect of the present disclosure is directed to the first aspect, in which the liquid sending unit sends the liquid to the nozzle by a piston moving in the liquid storage in a first direction and a second direction opposite to the first direction, and the piston moves only in one of the first direction and the second direction during one time of movement of the carriage in the carriage movement direction.

According to this aspect, the liquid sending unit sends the liquid to the nozzle by the piston moving in the liquid storage in the first direction and the second direction, and the piston moves only in one of the first direction and the second direction during one time of movement of the carriage in the carriage movement direction. That is, the movement direction of the piston does not change during one time of movement of the carriage in the carriage movement direction accompanying the ejection of the liquid. When the movement direction of the piston changes during one time of movement of the carriage in the carriage movement direction, a pressure fluctuation occurs during the change of the movement direction of the piston, which may cause pulsation in the liquid being sent, but such a risk can be prevented.

The liquid ejecting apparatus according to a third aspect of the present disclosure is directed to the second aspect, in which the liquid sending unit moves the piston using an air pressure.

According to this aspect, the liquid sending unit moves the piston using an air pressure. Therefore, the piston can be moved with a simple configuration.

The liquid ejecting apparatus according to a fourth aspect of the present disclosure is directed to the second or third aspect, in which the liquid sending unit switches movement of the piston between movement in the first direction and movement in the second direction for each one time of movement of the carriage in the carriage movement direction.

According to this aspect, the liquid sending unit switches the movement of the piston between the movement in the first direction and the movement in the second direction for each one time of movement of the carriage in the carriage movement direction. Therefore, it is possible to send the liquid to the nozzle by the liquid sending unit continuously while restricting a pressure fluctuation within a predetermined pressure range without increasing a size of the liquid storage.

The liquid ejecting apparatus according to a fifth aspect of the present disclosure is directed to the second or third aspect, in which the liquid sending unit switches movement of the piston between movement in the first direction and movement in the second direction every plurality of times of movement of the carriage in the carriage movement direction.

According to this aspect, the liquid sending unit switches the movement of the piston between the movement in the first direction and the movement in the second direction every plurality of times of movement of the carriage in the carriage movement direction. Therefore, the number of times of movement of the piston can be reduced, and the pressure fluctuation can be particularly effectively prevented.

The liquid ejecting apparatus according to a sixth aspect of the present disclosure is directed to any one of the first to third aspects, and further includes a plurality of the carriages.

According to this aspect, a plurality of the carriages are provided. Therefore, by using the plurality of carriages, it is possible to effectively perform a process on the medium using the liquid.

The liquid ejecting apparatus according to a seventh aspect of the present disclosure is directed to the sixth aspect, in which operation timings of the plurality of carriages are synchronized.

According to this aspect, operation timings of the plurality of carriages are synchronized. Therefore, the operations of the plurality of carriages can be easily controlled, and for example, the operations of the carriages can be controlled by one liquid sending unit.

The liquid ejecting apparatus according to an eighth aspect of the present disclosure is directed to any one of the first to third aspects, in which the head includes a plurality of the nozzles.

According to this aspect, the head includes a plurality of the nozzles. Therefore, by using the plurality of nozzles, it is possible to effectively perform a process on the medium using the liquid.

The liquid ejecting apparatus according to a ninth aspect of the present disclosure is directed to any one of the first to third aspects, in which an inner diameter of the nozzle is 150 μm or less.

According to this aspect, the inner diameter of the nozzle is 150 μm or less. With such a configuration, the liquid can be densely applied to the medium.

The liquid ejecting apparatus according to a tenth aspect of the present disclosure is directed to any one of the first to third aspects, in which an ejection speed of the liquid from the head is 10 m/s or more.

According to this aspect, the ejection speed of the liquid from the head is 10 m/s or more. With this configuration, the liquid can collide with the medium with high straightness, and the liquid can be applied with high accuracy to a desired position on the medium.

A liquid ejecting method according to an eleventh aspect of the present disclosure is a liquid ejecting method for a liquid ejecting apparatus. The liquid ejecting apparatus includes: a conveyor configured to convey a medium in a conveyance direction; a carriage configured to move in a carriage movement direction intersecting the conveyance direction at a position facing the medium conveyed in the conveyance direction; a head provided on the carriage and including at least one nozzle configured to eject a liquid to the medium in a continuous flow, make the continuous flow into droplets, and cause the continuous flow to collide with the medium in a form of droplets; a liquid storage configured to store the liquid to be sent to the nozzle; and a liquid sending unit configured to send the liquid in the liquid storage to the nozzle continuously. The liquid ejecting method includes: using the liquid storage whose volume is larger than a volume of the liquid ejected from the nozzle during one time of movement of the carriage in the carriage movement direction; and when the liquid is ejected from the nozzle, continuously sending the liquid in the liquid storage to the nozzle by the liquid sending unit while restricting a pressure fluctuation within a predetermined pressure range during one time of movement of the carriage in the carriage movement direction.

According to the aspect, by using the liquid storage whose volume is larger than a volume of the liquid ejected from the nozzle during the one time of movement of the carriage in the carriage movement direction, when the liquid is ejected from the nozzle, it is possible to continue to send the liquid in the liquid storage to the nozzle by the liquid sending unit while restricting a pressure fluctuation within a predetermined pressure range during one time of movement of the carriage in the carriage movement direction. Therefore, an occurrence of pulsation in the liquid being sent can be prevented, and an occurrence of unevenness in a liquid sending pressure can be prevented. Accordingly, it is possible to prevent ejecting unevenness when the liquid ejected in the continuous flow collides with the medium in the form of the droplets.

First Embodiment

Hereinafter, embodiments of a liquid ejecting apparatus according to the present disclosure will be described with reference to the accompanying drawings. First, an overview of a liquid ejecting apparatus 1A according to a first embodiment of the present disclosure will be described with reference to FIG. 1. As shown in FIG. 1, the liquid ejecting apparatus 1A according to the embodiment includes a conveyor 9 that conveys a medium M such as fabric in a conveyance direction A. The conveyor 9 in the embodiment is a roller pair provided in at least two locations. However, a configuration and the number of the conveyor 9 are not particularly limited. For example, the conveyor 9 may be a tray on which clothes such as a T-shirt or a liquid application object other than fabric is placed and conveyed as the medium M.

As shown in FIG. 1, the liquid ejecting apparatus 1A according to the embodiment includes a carriage 4 that moves in a carriage movement direction B intersecting the conveyance direction A at a position facing the medium M conveyed in the conveyance direction A. The carriage 4 is provided with a head 2 including at least one nozzle 27 that ejects a liquid 3 toward the medium M.

Here, the liquid ejecting apparatus 1A according to the embodiment is configured such that an inkjet printer or the like can be coupled upstream of the liquid ejecting apparatus 1A in the conveyance direction A. When an inkjet printer or the like is coupled upstream of the liquid ejecting apparatus 1A in the conveyance direction A, a solution containing, for example, a water repellent, an insecticide, a fungicide, or a fire retardant can be used as the liquid 3. In the liquid ejecting apparatus 1A according to the embodiment, even when no inkjet printer or the like is coupled upstream of the liquid ejecting apparatus 1A in the conveyance direction A, the liquid 3 containing, for example, a water repellent, an insecticide, a fungicide, or a fire retardant can be ejected to the medium M on which an image is formed by an inkjet printer or the like.

On the other hand, the liquid ejecting apparatus 1A according to the embodiment is configured such that an inkjet printer or the like can be coupled downstream of the liquid ejecting apparatus 1A in the conveyance direction A. When an inkjet printer or the like is coupled downstream of the liquid ejecting apparatus 1A in the conveyance direction A, for example, a solution containing a pretreatment agent for improving ink color development can be used as the liquid 3. In the liquid ejecting apparatus 1A according to the embodiment, even when no inkjet printer or the like is coupled downstream of the liquid ejecting apparatus 1A in the conveyance direction A, the liquid 3 containing, for example, a pretreatment agent can be ejected to the intended medium M on which an image is to be formed by an inkjet printer or the like.

The liquid ejecting apparatus 1 according to the present disclosure can be used for various purposes other than the above-described purposes. For example, it is possible to aim at cleaning or crushing a liquid application object serving as the medium M. When the liquid ejecting apparatus 1 is used for cleaning or crushing a liquid application object serving as the medium M, water may be used as the liquid 3.

Figure 2:
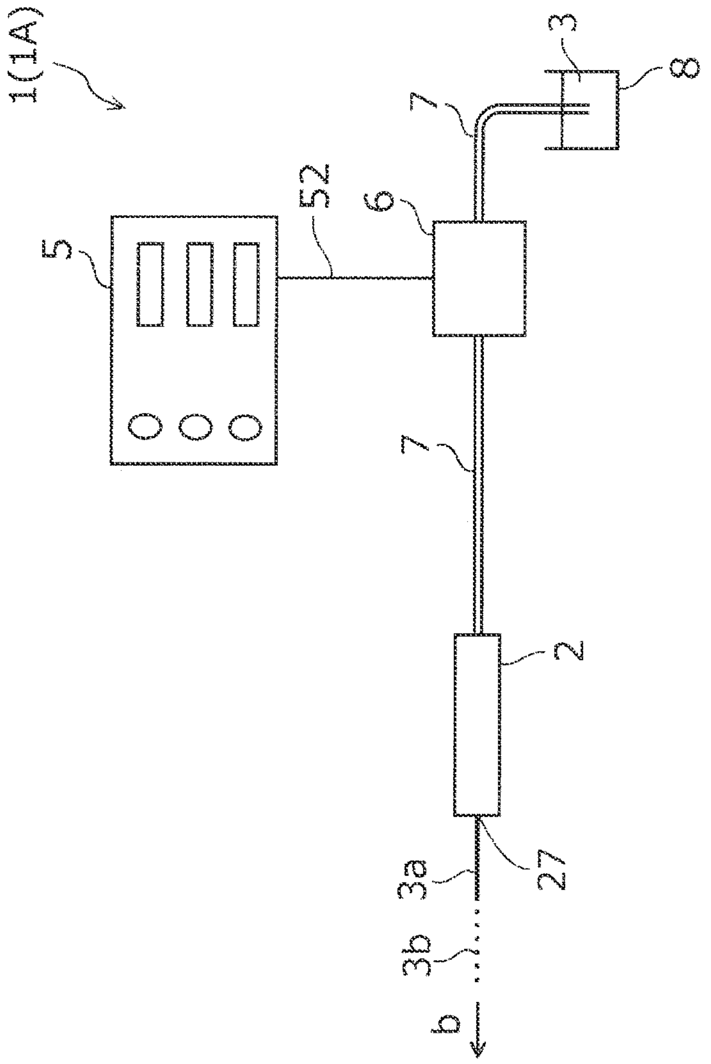
FIG. 2 is a schematic diagram showing a liquid supply path of the liquid ejecting apparatus in FIG. 1.

Next, a liquid supply path and the like of the liquid ejecting apparatus 1A in FIG. 1 will be described with reference to FIG. 2. As shown in FIG. 2, the liquid ejecting apparatus 1A according to the embodiment includes the head 2 that includes the nozzle 27, a liquid tank 8 that stores the liquid 3 to be ejected, a liquid conveyance pipe 7 that couples the head 2 to the liquid tank 8, a liquid sending unit 6, and a control unit 5 that includes a control signal line 52 coupled to the liquid sending unit 6. The control unit 5 controls the entire liquid ejecting apparatus 1A according to the embodiment. In addition, the head 2 is mounted on the carriage 4 as described above.

Here, the liquid ejecting apparatus 1A according to the embodiment is a liquid ejecting apparatus that causes droplets 3*b* to collide with the medium M in a state in which a continuous flow 3*a* of the liquid 3 ejected in a continuous state in a direction b from one or a plurality of the nozzles 27 provided on the head 2 is converted into the droplets 3*b*. With such a configuration, the liquid ejecting apparatus 1A according to the embodiment can apply the liquid 3 to a desired position on the medium M with high energy and high accuracy while reducing mist or the like. Therefore, the liquid 3 can be uniformly ejected to the medium M in a small amount.

As described above, the liquid ejecting apparatus 1A according to the embodiment includes the liquid tank 8 that stores the liquid 3 and the liquid sending unit 6 that sends the liquid 3 from the liquid tank 8 to the head 2. Therefore, the liquid ejecting apparatus 1A according to the embodiment can apply the liquid 3 to the medium M with particularly high energy by the liquid sending unit 6. Details of the liquid sending unit 6 provided in the liquid ejecting apparatus 1A according to the embodiment will be described later.

Figure 3:
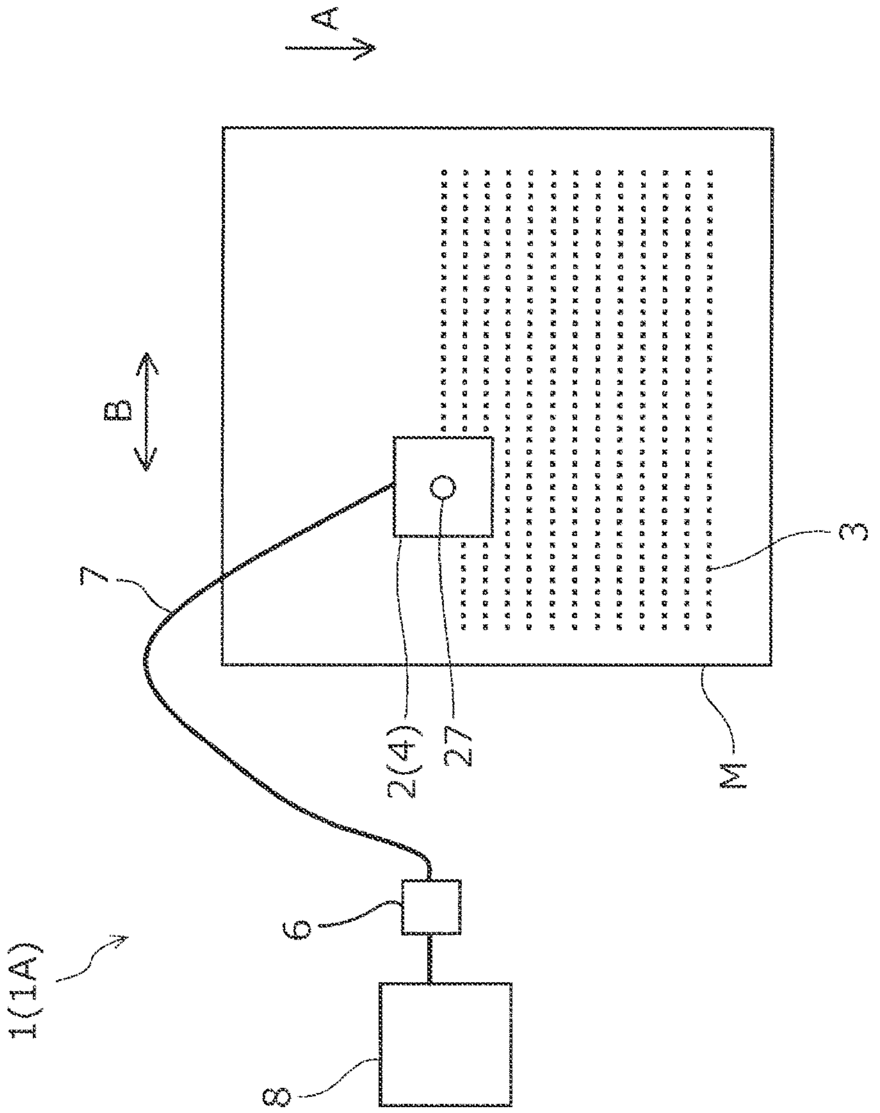
FIG. 3 is a schematic plan view showing a state in which a liquid is ejected to a conveyed medium using the liquid ejecting apparatus in FIG. 1.

Next, a state in which the liquid 3 is ejected to the conveyed medium M using the liquid ejecting apparatus 1A in FIG. 1 will be described with reference to FIG. 3. As described above, the liquid ejecting apparatus 1A according to the embodiment includes the conveyor 9. Here, the conveyor 9 can intermittently convey the medium M by repeatedly conveying the medium M in the conveyance direction A and stopping the conveyance under control of the control unit 5. The liquid ejecting apparatus 1A according to the embodiment can eject the liquid 3 from the head 2 to the medium M while moving the carriage 4 in the carriage movement direction B during stop of the intermittent conveyance of the medium M performed by the conveyor 9. FIG. 3 shows a state in which the carriage 4 is moved in the carriage movement direction B and the liquid 3 is ejected from the head 2 to the medium M during stop of the intermittent conveyance of the medium M performed by the conveyor 9. With such a configuration, the liquid ejecting apparatus 1A according to the embodiment can eject the liquid 3 to the stopped medium M, and thus ejection accuracy of the liquid 3 can be improved, and the liquid 3 can be particularly uniformly applied to the medium M.

On the other hand, under the control of the control unit 5, the liquid ejecting apparatus 1A according to the embodiment can continuously convey the medium M by the conveyor 9, and eject the liquid 3 from the head 2 to the medium M while moving the carriage 4 in the carriage movement direction B relative to the medium M continuously conveyed by the conveyor 9. Therefore, the liquid ejecting apparatus 1A according to the embodiment can efficiently apply the liquid 3 to the medium M in a short time.

Figure 4:
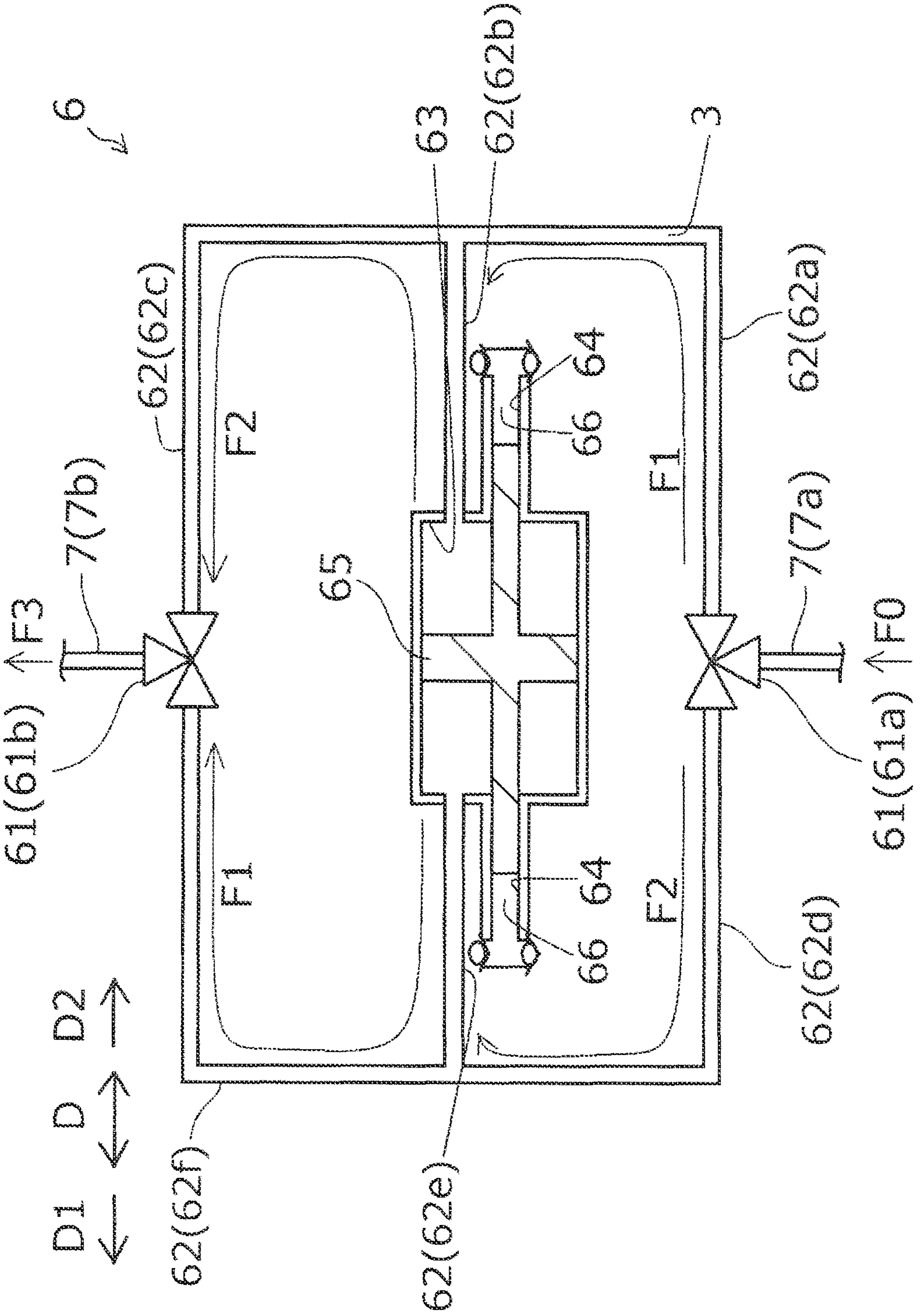
FIG. 4 is a cross-sectional view showing a liquid sending unit of the liquid ejecting apparatus in FIG. 1.

Here, a detailed configuration of the liquid sending unit 6 in the liquid ejecting apparatus 1A according to the embodiment will be described with reference to FIG. 4. As shown in FIG. 4, the liquid sending unit 6 according to the embodiment is coupled to a supply pipe 7*a* of the liquid conveyance pipe 7 that supplies the liquid 3 to the liquid sending unit 6 in a supply direction F0, and a discharge pipe 7*b* of the liquid conveyance pipe 7 that discharges the liquid 3 from the liquid sending unit 6 in a discharge direction F3. Here, the supply pipe 7*a* is coupled to a first three-way valve 61*a* as a three-way valve 61, the discharge pipe 7*b* is coupled to a second three-way valve 61*b* as the three-way valve 61, and the first three-way valve 61*a* and the second three-way valve 61*b* are coupled to a liquid sending pipe 62 from two directions.

As shown in FIG. 4, the liquid sending unit 6 includes a liquid sending pipe 62*a*, a liquid sending pipe 62*b*, a liquid sending pipe 62*c*, a liquid sending pipe 62*d*, a liquid sending pipe 62*e*, and a liquid sending pipe 62*f* as the liquid sending pipe 62. Here, the first three-way valve 61*a* is coupled to the liquid sending pipe 62*a*. The liquid sending pipe 62*a* is coupled to the liquid sending pipe 62*b* and the liquid sending pipe 62*c*. The liquid sending unit 6 includes a liquid storage 63 that stores the liquid 3 to be sent to the nozzle 27, and the liquid sending pipe 62*b* is coupled to the liquid storage 63. The liquid sending pipe 62*c* is coupled to the second three-way valve 61*b*. Similarly, the first three-way valve 61*a* is coupled to the liquid sending pipe 62*d*, the liquid sending pipe 62*d* is coupled to the liquid sending pipe 62*e* and the liquid sending pipe 62*f*, the liquid sending pipe 62*e* is coupled to the liquid storage 63, and the liquid sending pipe 62*f* is coupled to the second three-way valve 61*b*.

Further, the liquid sending unit 6 includes a piston portion 65, and the piston portion 65 is disposed to reach an inside of the liquid storage 63 and is movable in a movement direction D as a piston. Further, the liquid sending unit 6 includes an air filling portion 64 that accommodates a part of the piston portion 65 and is capable of changing an internal air pressure on both end sides in the movement direction D by being filled with air 66 and extracting the air 66 out via a tube (not shown). That is, by making the air pressure on the right side of the air filling portion 64 higher than the air pressure on the left side of the air filling portion 64 in FIG. 4, the piston portion 65 can be moved in a first direction D1 (left side in FIG. 4) in the movement direction D. Similarly, by making the air pressure on the left side of the air filling portion 64 higher than the air pressure on the right side of the air filling portion 64 in FIG. 4, the piston portion 65 can be moved in a second direction D2 (right side in FIG. 4) in the movement direction D.

By moving the piston portion 65 in the first direction D1, the liquid 3 stored in the liquid storage 63 is pushed to the left side in FIG. 4 by the piston portion 65 and moves in the liquid sending pipe 62*e* and the liquid sending pipe 62*f* in a direction F1. Then, the liquid 3 moves in the discharge pipe 7*b* in the discharge direction F3 via the second three-way valve 61*b*. At the same time, the liquid 3 supplied in the supply direction F0 to the first three-way valve 61*a* via the supply pipe 7*a* moves in the liquid sending pipe 62*a* and the liquid sending pipe 62*b* in the direction F1.

Conversely, by moving the piston portion 65 in the second direction D2, the liquid 3 stored in the liquid storage 63 is pushed to the right side in FIG. 4 by the piston portion 65 and moves in the liquid sending pipe 62*b* and the liquid sending pipe 62*c* in a direction F2. Then, the liquid 3 moves in the discharge pipe 7*b* in the discharge direction F3 via the second three-way valve 61*b*. At the same time, the liquid 3 supplied in the supply direction F0 to the first three-way valve 61*a* via the supply pipe 7*a* moves in the liquid sending pipe 62*d* and the liquid sending pipe 62*e* in the direction F2.

Figure 5:
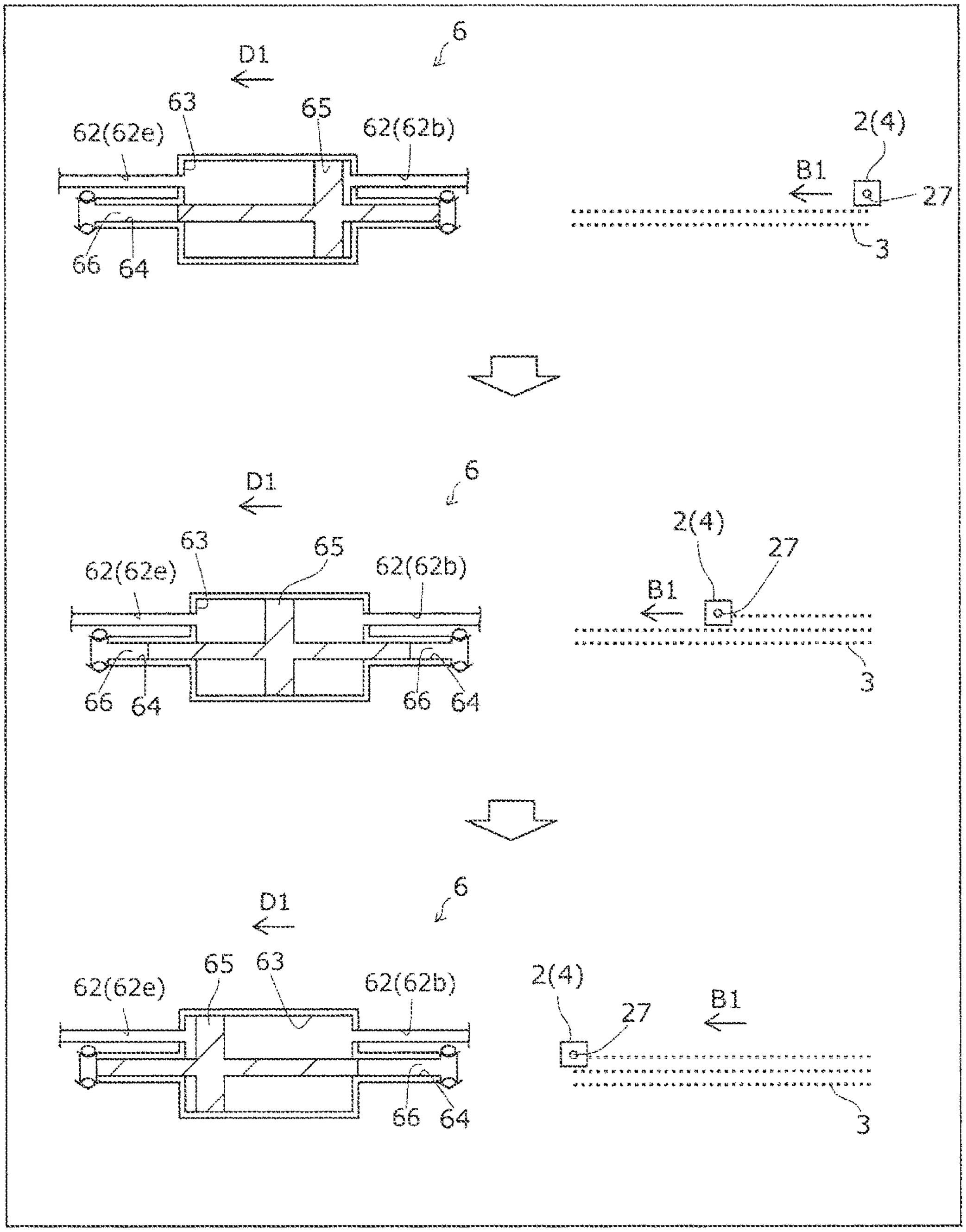
FIG. 5 is a schematic view showing a state in which the liquid is ejected to the conveyed medium while a carriage is moving in a forward path by using the liquid ejecting apparatus in FIG. 1, and a state of the liquid sending unit, in comparison with each other.
Figure 6:
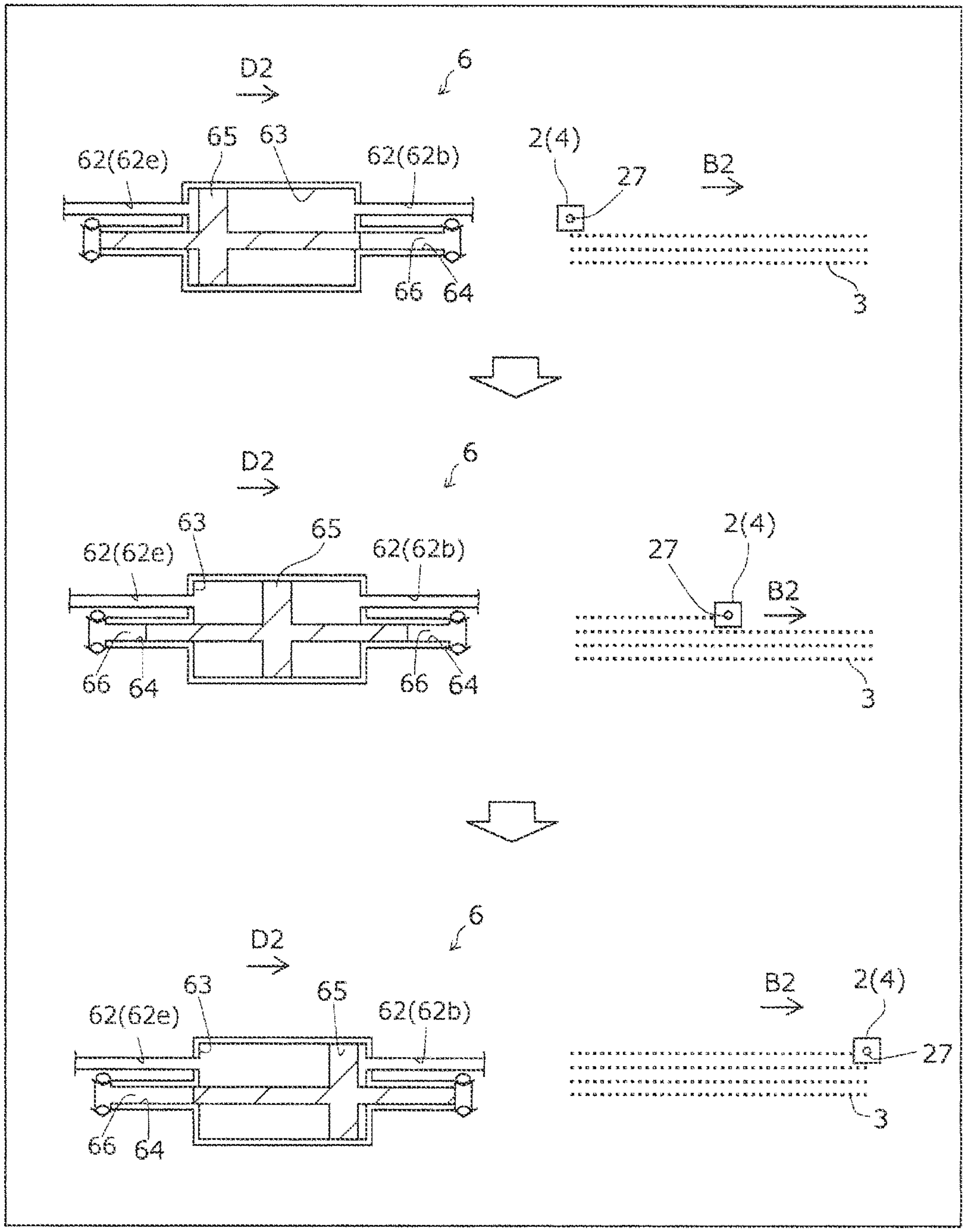
FIG. 6 is a schematic view showing a state in which the liquid is ejected to the conveyed medium while the carriage is moving in a backward path by using the liquid ejecting apparatus in FIG. 1, and a state of the liquid sending unit, in comparison with each other.

Next, referring to FIGS. 5 and 6, how the piston portion 65 moves relative to reciprocating movement of the carriage 4 will be described by comparing the reciprocating movement of the carriage 4 with the movement of the piston portion 65. First, the movement of the carriage 4 in a forward path B1 in the carriage movement direction B will be described with reference to FIG. 5. As shown in a state on an upper side of FIG. 5, in a state before the carriage 4 moves in the forward path B1, the piston portion 65 is positioned at one side end portion (right side end portion in FIG. 5) of the liquid storage 63. As shown in a state on a center side of FIG. 5, when the carriage 4 moves in the forward path B1, the piston portion 65 also moves in the first direction D1 in accordance with the movement of the carriage 4. As shown in a state on a lower side of FIG. 5, when the movement of the carriage 4 in the forward path B1 stops, the movement of the piston portion 65 in the first direction D1 also stops in accordance with the stop of the movement of the carriage 4.

Next, the movement of the carriage 4 in a backward path B2 in the carriage movement direction B will be described with reference to FIG. 6. As shown in a state on an upper side of FIG. 6 corresponding to the state on the lower side of FIG. 5, in a state before the carriage 4 moves in the backward path B2, the piston portion 65 is positioned at the other side end portion (left side end portion in the FIG. 6) of the liquid storage 63. As shown in a state on a center side of FIG. 6, when the carriage 4 moves in the backward path B2, the piston portion 65 also moves in the second direction D2 in accordance with the movement of the carriage 4. As shown in a state on a lower side of FIG. 6, when the movement of the carriage 4 in the backward path B2 stops, the movement of the piston portion 65 in the second direction D2 also stops in accordance with the stop of the movement of the carriage 4. In the embodiment, the forward path B1 and the first direction D1 are in the same direction, and the backward path B2 and the second direction D2 are in the same direction. For example, the forward path B1 and the second direction D2 may be the same direction, and the backward path B2 and the first direction D1 may be the same direction.

With such a configuration, the liquid sending unit 6 according to the embodiment can continue to send the liquid 3 in the liquid storage 63 to the nozzle 27 while restricting a pressure fluctuation within a predetermined pressure range during one time of movement of the carriage 4 (one time of movement in the forward path B1 or one time of movement in the backward path B2) in the carriage movement direction B. In the liquid sending unit 6 according to the embodiment, a volume of the liquid storage 63 is larger than a volume of the liquid 3 to be ejected from the nozzle 27 during one time of movement of the carriage 4 in the carriage movement direction B.

From another viewpoint, in a liquid ejecting method that can be executed using the liquid ejecting apparatus 1A according to the embodiment, the liquid storage 63 having a volume larger than a volume of the liquid 3 to be ejected from the nozzle 27 during one time of movement of the carriage 4 in the carriage movement direction B is used, and when the liquid 3 is ejected from the nozzle 27, the liquid 3 in the liquid storage 63 can be continuously sent to the nozzle 27 by the liquid sending unit 6 while restricting a pressure fluctuation within a predetermined pressure range during the one time of movement of the carriage 4 in the carriage movement direction B. Therefore, the liquid ejecting apparatus 1A according to the embodiment can prevent an occurrence of pulsation in the liquid 3 being sent, and can prevent an occurrence of unevenness in a liquid sending pressure. Accordingly, the liquid ejecting apparatus 1A according to the embodiment can prevent ejecting unevenness when the liquid 3 ejected in the continuous flow 3*a* collides with the medium M in the form of the droplets 3*b*. Specifically, the "predetermined pressure range" is preferably a pressure fluctuation of 20% or less, and more preferably a pressure fluctuation of 10% or less. In the embodiment, the "predetermined pressure range" is a pressure fluctuation of 10% or less.

Further, as described above, the liquid sending unit 6 sends the liquid 3 to the nozzle 27 by the piston portion 65 as the piston moving in the first direction D1 and the second direction D2 in the liquid storage 63. The piston portion 65 moves only in one of the first direction D1 and the second direction D2 during one time of movement of the carriage 4 in the carriage movement direction B. That is, the movement direction D of the piston portion 65 does not change during one time of movement of the carriage 4 in the carriage movement direction B accompanying the ejection of the liquid 3. When the movement direction D of the piston portion 65 changes during one time of movement of the carriage 4 in the carriage movement direction B, a pressure fluctuation occurs during the change of the movement direction D of the piston portion 65, which may cause pulsation in the liquid 3 being sent, but such a risk can be prevented.

Further, as described above, the liquid sending unit 6 moves the piston portion 65 using the air pressure. Therefore, the liquid ejecting apparatus 1A according to the embodiment has a configuration in which the piston portion 65 can be moved as the piston with a simple configuration. However, the piston may have a configuration other than the piston portion 65, and the piston may be moved by a method other than the air pressure type. Examples of the method other than the air pressure type of moving the piston include a method using a water head difference (negative pressure), a water pressure method, a hydraulic pressure method, a method using a motor, a method using an engine, and the like.

As described above, the liquid sending unit 6 is configured to switch the movement of the piston portion 65 between the movement in the first direction D1 and the movement in the second direction D2 for each one time of movement of the carriage 4 in the carriage movement direction B. Since the liquid ejecting apparatus 1A according to the embodiment has such a configuration, it is possible to continuously send the liquid 3 to the nozzle 27 while restricting a pressure fluctuation within a predetermined pressure range without increasing a size of the liquid storage 63.

The configuration is not limited to this. For example, the liquid storage 63 may be formed to be large, and the liquid sending unit 6 is configured to switch the movement of the piston portion 65 between the movement in the first direction D1 and the movement in the second direction D2 every plurality of times of movement of the carriage 4 in the carriage movement direction B. With such a configuration, the number of times of movement of the piston portion 65 can be reduced, and the pressure fluctuation can be particularly effectively restricted.

The liquid ejecting apparatus 1A according to the embodiment has a configuration allowing heads having various configurations to be used as the head 2. Examples of the head 2 that can be used in the liquid ejecting apparatus 1A according to the embodiment will be described with reference to FIGS. 7 to 14.

Figure 7:
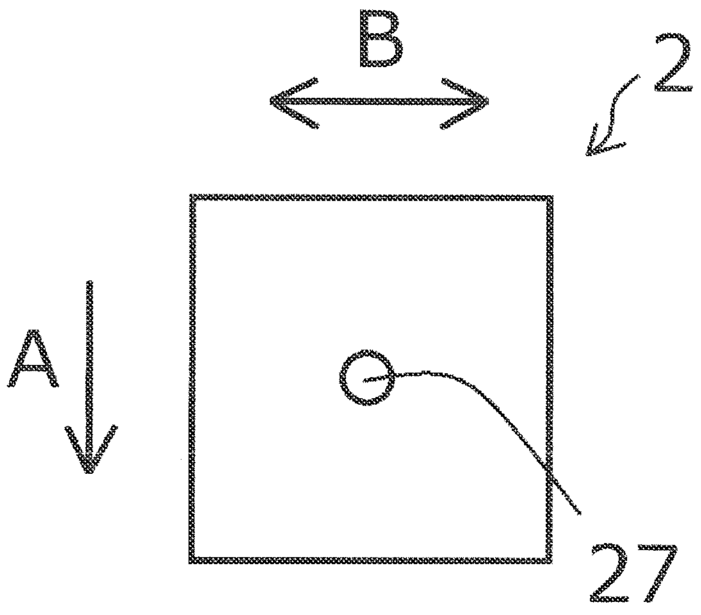
FIG. 7 is a schematic bottom view showing an example of a head usable in the liquid ejecting apparatus in FIG. 1.
Figure 8:
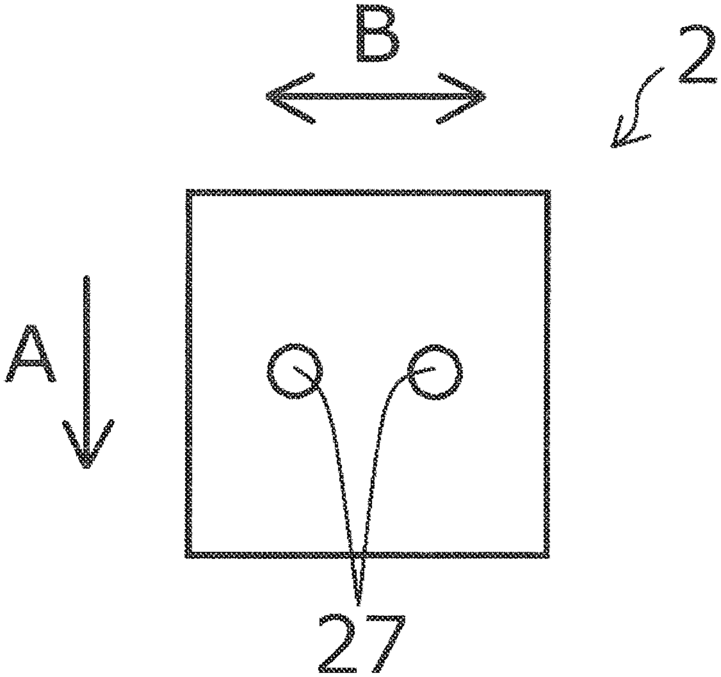
FIG. 8 is a schematic bottom view showing an example of the head usable in the liquid ejecting apparatus in FIG. 1.

First, the head 2 shown in FIG. 7 includes only one nozzle 27. Thus, the head 2 may include only one nozzle 27. The head 2 may also include a plurality of nozzles 27. The head 2 shown in FIG. 8 includes two nozzles 27 arranged along the carriage movement direction B. Three or more nozzles 27 may be provided along the carriage movement direction B.

Figure 9:
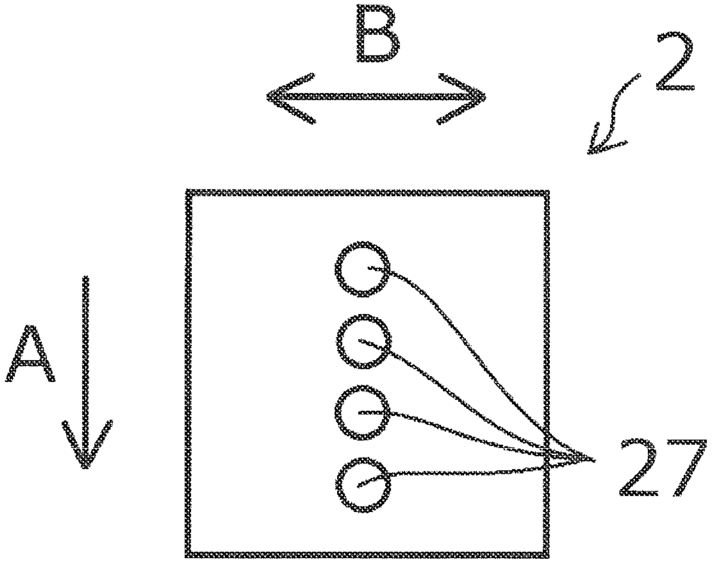
FIG. 9 is a schematic bottom view showing an example of the head usable in the liquid ejecting apparatus in FIG. 1.
Figure 10:
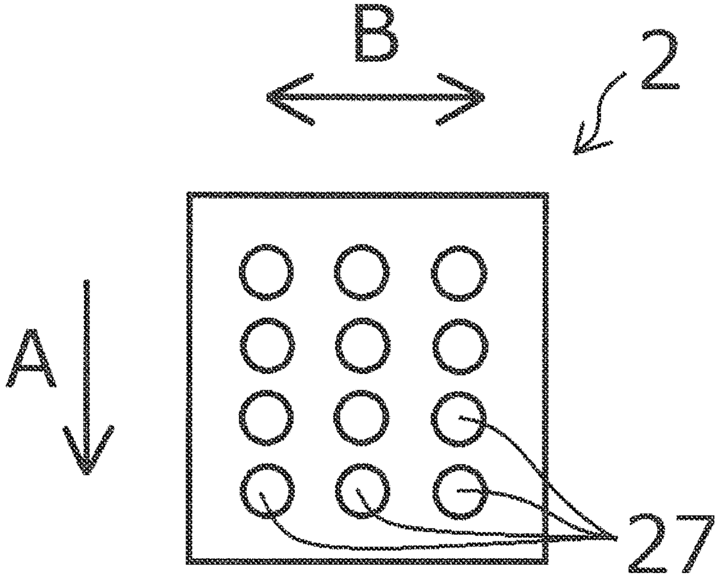
FIG. 10 is a schematic bottom view showing an example of the head usable in the liquid ejecting apparatus in FIG. 1.
Figure 11:
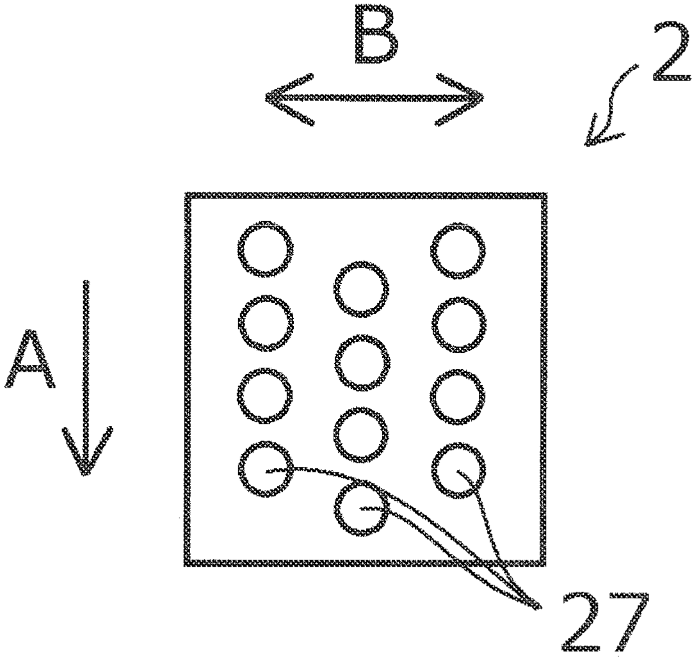
FIG. 11 is a schematic bottom view showing an example of the head usable in the liquid ejecting apparatus in FIG. 1.

The head 2 shown in FIG. 9 includes four nozzles 27 arranged along the conveyance direction A. Two, three, or five or more nozzles 27 may be arranged along the conveyance direction A. The head 2 shown in FIGS. 10 and 11 includes three nozzle rows each including a plurality of nozzles 27 arranged along the conveyance direction A. Positions of the nozzles 27 in each nozzle row in the carriage movement direction B may be aligned as in the head 2 shown in FIG. 10, or the positions of the nozzles 27 in each nozzle row may not be aligned in the carriage movement direction B, as in the head 2 shown in FIG. 11.

As described above, the head 2 preferably includes a plurality of nozzles 27. By using the plurality of nozzles 27, it is possible to effectively perform a process on the medium M using the liquid 3. Thus, according to one preferable aspect, the head 2 includes a nozzle row in which a plurality of nozzles 27 are arranged along the conveyance direction A. With such a configuration, the liquid 3 can be efficiently applied to the medium M.

Figure 12:
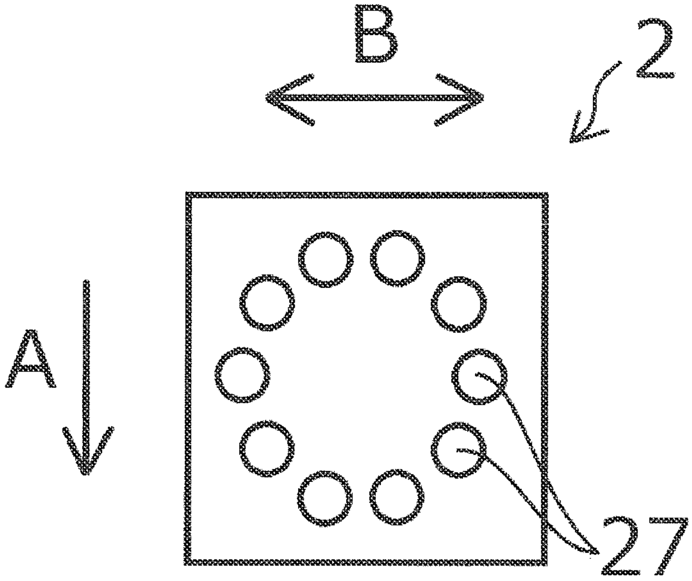
FIG. 12 is a schematic bottom view showing an example of the head usable in the liquid ejecting apparatus in FIG. 1.
Figure 13:
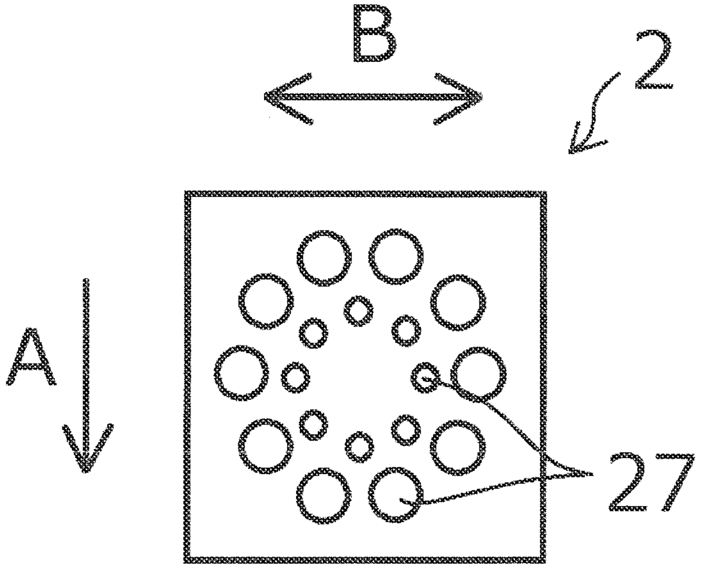
FIG. 13 is a schematic bottom view showing an example of the head usable in the liquid ejecting apparatus in FIG. 1.
Figure 14:
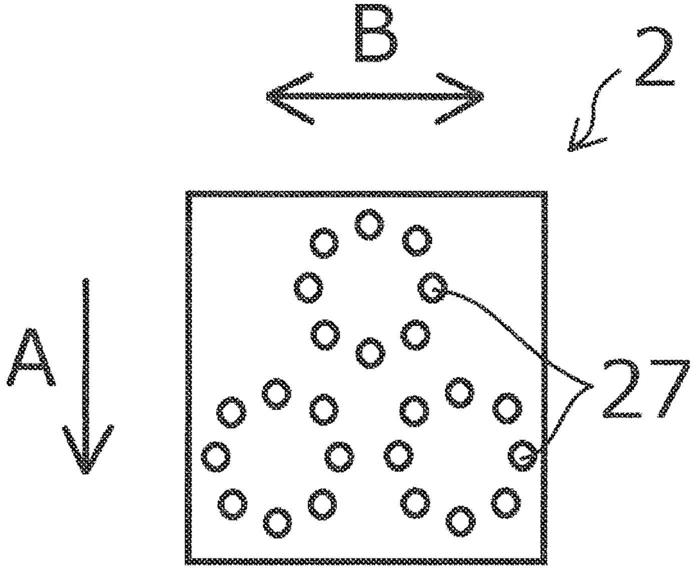
FIG. 14 is a schematic bottom view showing an example of the head usable in the liquid ejecting apparatus in FIG. 1.

In the head 2 shown in each of FIGS. 12, 13, and 14, a plurality of nozzles 27 are arranged in a circular shape. With such a configuration, the liquid 3 can be efficiently applied to the medium M. Here, in the head 2 shown in FIG. 12, a plurality of nozzles 27 are arranged in a single circular shape, and in the head 2 shown in FIG. 13, a plurality of nozzles 27 are concentrically arranged in two circular shapes. In addition, in the head 2 shown in FIG. 14, a plurality of nozzles 27 are arranged in three circular shapes in a nonconcentric manner. Thus, a disposition of the nozzles 27 is not particularly limited. In addition, in the head 2 shown in FIG. 13, each of the nozzles 27 forming an outer circle has a larger inner diameter than that of each of the nozzles 27 forming an inner circle. Thus, the inner diameter of the nozzle 27 is not particularly limited. In addition, the plurality of nozzles 27 may be disposed, for example, in a polygonal shape instead of a circular shape.

The inner diameter of the nozzle 27 is preferably 150 μm or less, regardless of whether there is one or a plurality of nozzles 27. With this configuration, the liquid 3 can be densely applied to the medium M. The inner diameter of the nozzle is preferably 10 μm or more. This is because, by setting the inner diameter of the nozzle to 10 μm or more, the liquid ejected from the nozzle can be effectively prevented from becoming mist.

An ejection speed of the liquid 3 from the head 2 is preferably 10 m/s or more. With this configuration, the liquid 3 can collide with the medium M with high straightness, and the liquid 3 can be applied with high accuracy to a desired position on the medium M. The ejection speed of the liquid 3 from the head 2 is particularly preferably 20 m/s or more. This is because the liquid 3 can be ejected to a particularly accurate position on the medium M. In addition, the ejection speed of the liquid 3 is preferably 160 m/s or less. This is because damage to the medium M can be inhibited by setting the ejection speed of the liquid 3 to 160 m/s or less.

Second Embodiment

Figure 15:
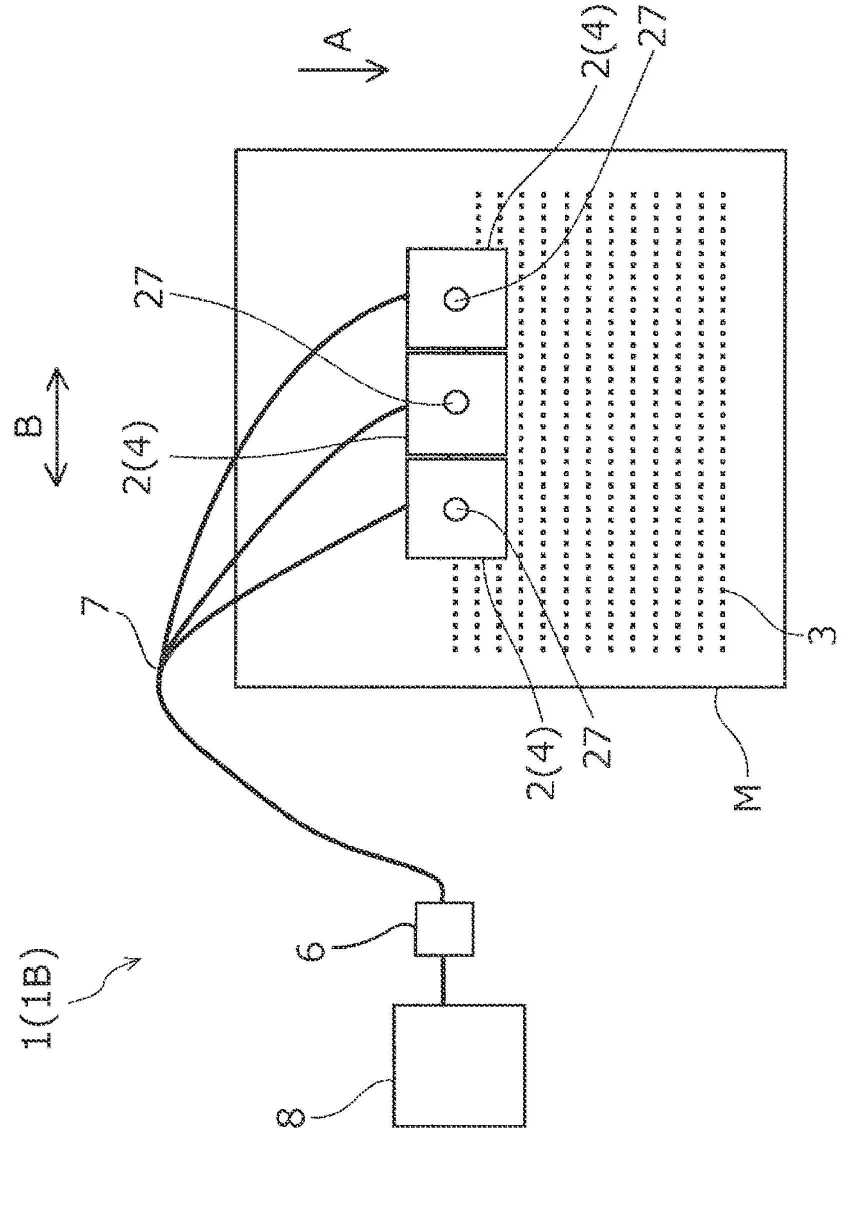
FIG. 15 is a schematic plan view showing a state in which the liquid is ejected to a conveyed medium using a liquid ejecting apparatus according to a second embodiment.

Hereinafter, a liquid ejecting apparatus 1B according to a second embodiment will be described with reference to FIG. 15. FIG. 15 is a diagram corresponding to FIG. 3 showing the liquid ejecting apparatus 1A according to the first embodiment. The liquid ejecting apparatus 1B according to the embodiment is the same as the liquid ejecting apparatus 1A according to the first embodiment except for a configuration to be described later. Therefore, the liquid ejecting apparatus 1B according to the embodiment has the same features as the liquid ejecting apparatus 1A according to the first embodiment except for those to be described later. In FIG. 15, the same constituent elements as those in the first embodiment are denoted by the same reference numerals, and detailed description thereof is omitted.

As described above, the liquid ejecting apparatus 1A according to the first embodiment includes one carriage 4. On the other hand, as shown in FIG. 15, the liquid ejecting apparatus 1B according to the embodiment includes three carriages 4. Thus, a plurality of carriages 4 may be provided. With such a configuration, by using the plurality of carriages 4, it is possible to effectively perform a process on the medium M using the liquid 3.

Here, in the liquid ejecting apparatus 1B according to the embodiment, an operation of the carriages 4 is controlled by one liquid sending unit 6, and thus operation timings of the plurality of carriages 4 are synchronized. In this manner, for example, by controlling the operation of the carriages 4 using one liquid sending unit 6, the control of the operation of the plurality of carriages 4 is simplified.

In the liquid ejecting apparatus 1B according to the embodiment, the three carriages 4 movable in the carriage movement direction B orthogonal to the conveyance direction A are arranged along the carriage movement direction B, but the present disclosure is not limited to such a configuration. For example, two or four or more carriages 4 movable in the carriage movement direction B orthogonal to the conveyance direction A may be arranged in a line or arranged in a staggered manner.

The liquid ejecting apparatus 1B according to the embodiment includes three carriages 4 that can eject the same liquid 3 from the heads 2, and may also include a plurality of carriages 4 that can eject different types of liquids 3 from the heads 2. Further, for example, a plurality of liquid sending units 6 may be provided, and the operations of the plurality of carriages 4 may not be synchronized.

The present disclosure is not limited to the above-described embodiments, and can be implemented by various configurations without departing from the gist of the present disclosure. For example, the liquid 3 may not be applied to fabric, and for example, the carriage 4 may be attached to a tip of a robot arm such that the liquid 3 can be applied not only to a flat surface but also to a curved surface. Further, the liquid sending unit 6 may not use the piston portion as the piston as in the embodiment, but may use, for example, a diaphragm as the piston.

In addition, technical features in the embodiments corresponding to technical features in the aspects described in the summary can be replaced or combined as appropriate in order to solve a part or all of the above-described problems or in order to obtain a part or all of the above-described effects. In addition, unless the technical features are described as being essential in the present description, the technical features can be appropriately deleted.

What is claimed is:

1. A liquid ejecting apparatus comprising:

a conveyor configured to convey a medium in a conveyance direction;

a carriage configured to move in a carriage movement direction intersecting the conveyance direction at a position facing the medium conveyed in the conveyance direction;

a head provided on the carriage and including at least one nozzle configured to eject a liquid to the medium in a continuous flow, make the continuous flow into droplets, and cause the droplets to collide with the medium;

a liquid storage configured to store the liquid to be sent to the nozzle; and a liquid sending unit configured to send the liquid in the liquid storage to the nozzle continuously while restricting a pressure fluctuation within a predetermined pressure range during one time of movement of the carriage in the carriage movement direction, wherein a volume of the liquid storage is larger than a volume of the liquid ejected from the nozzle during one time of movement of the carriage in the carriage movement direction, the liquid sending unit sends the liquid to the nozzle by a piston moving in the liquid storage in a first direction and a second direction opposite to the first direction, and the piston moves only in one of the first direction and the second direction during one time of movement of the carriage in the carriage movement direction.

2. The liquid ejecting apparatus according to claim 1, wherein the piston is moved by using an air pressure.

3. The liquid ejecting apparatus according to claim 1, wherein the liquid sending unit switches movement of the piston between movement in the first direction and movement in the second direction for each one time of movement of the carriage in the carriage movement direction.

4. The liquid ejecting apparatus according to claim 1, wherein the liquid sending unit switches movement of the piston between movement in the first direction and movement in the second direction every plurality of times of movement of the carriage in the carriage movement direction.

5. The liquid ejecting apparatus according to claim 1, further comprising:

a plurality of the carriages.

6. The liquid ejection apparatus according to claim 5, wherein operation timings of the plurality of carriages are synchronized.

7. The liquid ejecting apparatus according to claim 1, wherein the head includes a plurality of the nozzles.

8. The liquid ejecting apparatus according to claim 1, wherein an inner diameter of the nozzle is 150 μm or less.

9. The liquid ejecting apparatus according to claim 1, wherein an ejection speed of the liquid ejected from the head is 10 m/s or more.

10. A liquid ejecting method for a liquid ejecting apparatus, the liquid ejecting apparatus including a conveyor configured to convey a medium in a conveyance direction, a carriage configured to move in a carriage movement direction intersecting the conveyance direction at a position facing the medium conveyed in the conveyance direction, a head provided on the carriage and including at least one nozzle configured to eject a liquid to the medium in a continuous flow, make the continuous flow into droplets, and cause the continuous flow to collide with the medium in a form of droplets, a liquid storage configured to store the liquid to be sent to the nozzle, and a liquid sending unit configured to send the liquid in the liquid storage to the nozzle continuously, the liquid ejecting method comprising:

using the liquid storage whose volume is larger than a volume of the liquid ejected from the nozzle during one time of movement of the carriage in the carriage movement direction; and when the liquid is ejected from the nozzle, continuously sending the liquid in the liquid storage to the nozzle by the liquid sending unit while restricting a pressure fluctuation within a predetermined pressure range during one time of movement of the carriage in the carriage movement direction, wherein the liquid sending unit sends the liquid to the nozzle by a piston moving in the liquid storage in a first direction and a second direction opposite to the first direction, and the piston moves only in one of the first direction and the second direction during one time of movement of the carriage in the carriage movement direction.

* * * * *